3,196,142
POLYMERIZATION OF CONJUGATED DIOLEFINS WITH AN ALKALI METAL PHOSPHIDE CATALYST
Chris E. Best, Akron, Ohio, assignor to The Firestone Tire & Rubber Company, Akron, Ohio, a corporation of Ohio
No Drawing. Filed Apr. 24, 1961, Ser. No. 104,825
2 Claims. (Cl. 260—94.2)

This invention relates to the polymerization of conjugated diolefins and to novel catalysts therefor.

In recent years two entirely different non-aqueous, catalytic systems have been devised for polymerizing conjugated diolefins to highly linear, stereospecific, rubbery polymers. One system utilizes lithium metal or an organolithium compound as the catalyst. The other system uses a combination catalyst comprising a metallic reducing agent (e.g., a trialkylaluminum) and a salt of a heavy metal (e.g., titanium tetrachloride).

An object of the present invention is to provide a novel catalyst system for polymerizing conjugated diolefins. Another object is to provide a novel polymerization catalyst. A further object is to provide a novel process of manufacturing synthetic rubber. Another object is to provide novel synthetic rubber. The above and further objects will be apparent in the description of the invention which follows.

The objects of the invention are realized through the discovery that a conjugated diolefin can be polymerized by contact with a nitride, phosphide, arsenide or antimonide. The catalyst is a compound of any of the metals of Groups IA, IIA, IIB, IIIA or IVA as listed in the Periodic Chart of the Elements given in Lange's "Handbook of Chemistry," ninth edition, Handbook Publishers, Inc., Sandusky, Ohio, 1956, pages 56 and 57. In general, these are metals of high reducing potential and include, e.g., lithium, sodium, potassium, rubidium, cesium, beryllium, magnesium, calcium, strontium, zinc, cadmium, barium, aluminum, gallium, indium, germanium and equivalents such as tetrahydrocarbon-substituted ammoniums (i.e., quaternary ammoniums), and the like. Any of the nitrides, phosphides, arsenides or antimonides of these metals (cations) can be used, such as lithium nitride ($Li_3N$), sodium nitride, potassium nitride, calcium nitride ($Ca_3N_2$), magnesium nitride, barium nitride, aluminum nitride (AlN), gallium nitride, lithium phosphide ($Li_3P$), sodium phosphide ($Na_3P$), lithium arsenide ($Li_3As$), potassium arsenide, lithium antimonide ($Li_3Sb$), sodium antimonide, mixed phosphides such as lithium magnesium phosphide (LiMgP), condensed phosphides such as those of the formulae $Li_2P_5$, $Na_2P_5$, $K_2P_5$, and the like, magnesium sesquiphosphide ($Mg_3P_2$), calcium sesquiphosphide ($Ca_3P_2$), zinc phosphides ($ZnP_2$ and $Zn_3P_2$), boron phosphide (BP), aluminum phosphide (AlP), tetramethylammonium phosphide and the like. It will be understood that mixtures of nitrides, phosphides, arsenides and antimonides such as above indicated as being suitable can also be employed as the catalyst of the invention. The various nitrides, phosphides, etc. of the invention are known and in general are simply prepared by direct reaction at moderately elevated temperatures of the nonmetallic element (nitrogen, phosphorus, etc.) with the desired free metal. Catalysts of the invention containing free nonmetallic elements are contemplated as operable.

The conjugated diolefins contemplated for use in the invention are butadiene-1,3, isoprene, piperylene and 2,3-dimethylbutadiene-1,3. Other known conjugated diolefins can be used. Mixtures of any of these diolefins can be polymerized in accordance with the invention.

The catalyst of the invention is usually used at a level of about 0.1 to 10 millimoles per 100 grams of conjugated diolefin monomers, although higher or lower catalyst levels can be used, say from 0.005 to 50 millimoles per 100 grams of monomer. The polymerization of the invention can be carried out in bulk, in the absence of a solvent, but a non-aqueous solvent is desired. A suitable solvent avoids any compound reactive with the catalyst. Excluded are compounds containing reactive hydrogen or alphaacetylenic groups. Preferred solvents are liquid hydrocarbon solvents for rubber, including aromatic, cycloaliphatic and aliphatic hydrocarbons containing no more than one olefinic double bond per molecule. Examples are petroleum ether, gasoline, pentanes, hexanes, heptanes, octanes, decanes, kerosene, diesel oil, fuel oil, benzene, toluene, xylenes, cymene, terpene hydrocarbons, cyclopentane, cyclohexane, methylcyclopentane, methylcyclohexane, isopentenes, pentenes, cyclopentene, hexenes, cyclohexene, heptenes, octenes, butenes, diisobutylene, propylene dimers, trimers and tetramers, and the like.

With the foregoing discussion of the invention in mind, the following detailed examples are given. All parts and percentages are given on the basis of weight unless otherwise indicated.

EXAMPLE 1

*Preparation of sodium phosphide*

Sodium paste dispersion (35%
  sodium, in petrolatum)_____ 98.5 g. (1.5 g.-atom).
Red phosphorus _____ 15.5 g. (0.5 g.-atom).
White mineral oil [1]_____ 250 ml.

[1] "Sohio light oil 72," a 72 Saybolt viscosity mineral oil distributed by the Standard Oil Company of Ohio. All further references in this and other examples to follow are intended to refer to this oil.

For this preparation there was provided a 500 ml. three-necked flask equipped with a nitrogen inlet, a vent, a rotary stirrer and a heating mantle. The mineral oil and sodium dispersion were charged first, followed by the phosphorus, after which the flask was purged with nitrogen, the flow of which was continued throughout the reaction to follow, stirring commenced and the temperature raised to 95° C. This was continued for 4 hours, at the end of which the temperature was raised to 195° C. for 18 hours. The reaction mass was cooled to 25° C., and transferred to a storage bottle, which was purged with nitrogen, and the contents made up with mineral oil to provide a solution 1.0 molar in $Na_3P$, based on the phosphorus charged.

EXAMPLE 2

*Preparation of sodium phosphide*

Mineral oil _____ 250 ml.
White phosphorus _____ 12.1 g. (.39 g.-atom).
Sodium paste dispersion (in
  petrolatum, 35% Na)_____ (1.17 g.-atom of Na).

A 500 ml. three-necked flask provided with a nitrogen inlet, a nitrogen vent and a stirrer was used in the preparation. The phosphorus and mineral oil were charged first, and the flask heated to 150° C. with nitrogen flow to purge moisture. The phosphorus dissolved completely. The flask was then cooled to 25° C. The sodium paste was added in increments, evolution of heat being observed at each addition. The reaction mass was then stirred for 1 hour at room temperature, and thereafter at temperatures rising to 120° C. for a further hour. The reaction mass was then cooled to 25° C. and transferred to a storage bottle which was flushed with nitrogen and sealed with a crown cap provided with a perforation for hypodermic withdrawal of the contents.

EXAMPLE 3

Polymerization of butadiene-1,3

| | | |
|---|---|---|
| Hexane | grams | 300 |
| Butadiene | do | 100 |
| Sodium phosphide | millimoles | 4 |

A solution of the butadiene in the hexane had previously been treated to remove moisture and alpha-acetylenes by methods known to the art. The sodium phosphide preparation was as described in Example 2. The catalyst and solution of butadiene were charged into a 28-ounce beverage bottle, which was capped and placed on a polymerizer wheel which revolved and dipped the bottle into a water bath at 50° C. for 20 hours. The bottle was then opened and found to contain no appreciable unpolymerized butadiene, as there was no excess pressure in the bottle when it was opened. The reaction mixture, a viscous amber-colored solution, was treated with 10 ml. of methanol containing about 0.3 gram of rubber antioxidant to neutralize the catalyst and protect the polymer product from atmospheric degradation. Then the liquid contents of the bottle were transferred to a glass beaker. Most of the solvent was removed by heating the beaker in a boiling water bath, and residual solvent was evaporated in a vacuum oven for 6 hours at 70° C. The residual polymer product weighed 95 grams and was a solid rubber.

EXAMPLE 4

Polymerization of butadiene-1,3

| | | |
|---|---|---|
| Hexane | grams | 300 |
| Butadiene | do | 100 |
| Sodium phosphide | millimoles | 1 |

A purified solution (as in Example 3) of the butadiene in hexane was charged into a beverage bottle, and the sodium phosphide catalyst (prepared as in Example 2) was then added. The bottle was sealed and placed on a polymerizer wheel which revolved and dipped the bottle into a water bath maintained at 50° C. After 20 hours there was no visible evidence that polymerization had taken place in the bottle, and a gauge pressure of 19 pounds per square inch observed in the bottle indicated that much unpolymerized monomer was present. The bottle was returned to the polymerizer wheel and agitated thereon at 50° C. for a total time of 64 hours. Then the bottle was removed from the wheel and opened. The reaction mixture was noticeably viscous, showing presence of rubbery polybutadiene. An equal volume of methanol was mixed with a portion of the reaction mixture, and a white, rubbery polymer was thereby precipitated.

The chemical literature indicates that definite compounds, such as the nitrides, phosphides, etc. shown above, are produced by reaction of any of the metals taught herein with the nonmetallic elements mentioned above. However, the catalysts of the invention include such reaction products regardless of their exact chemical constitution.

Another characterization of suitable solvents for the polymerization reaction of the invention is that they are nonprotic, that is, the preferred solvents do not supply protons (which would react with the catalyst of the invention) under usual conditions of polymerization.

Isoprene, mixtures of butadiene and isoprene, as well as the other diolefin monomers mentioned above, polymerize to solid rubbers in contact with the sodium phosphide catalysts detailed in the examples. Likewise, the other catalysts of the invention, disclosed above, can be substituted for or mixed with the sodium phosphide catalyst to produce synthetic rubbers from one or more of the conjugated diolefins disclosed.

What is claimed is:

1. Method of producing a rubbery polymer by polymerizing conjugated diolefins, comprising contacting a diolefin selected from the group consisting of butadiene-1,3, isoprene, piperylene and 2,3-dimethylbutadiene-1,3 with from 0.005 to 50 millimoles per 100 grams of monomer of a catalyst consisting essentially of an alkali metal phosphide, in the absence of a protic solvent.

2. Method of producing rubbery polybutadiene, comprising contacting butadiene-1,3 with from 0.005 to 50 millimoles per 100 grams of monomer of a catalyst consisting essentially of sodium phosphide, in the absence of a protic solvent.

References Cited by the Examiner

FOREIGN PATENTS

| 1,125 | 1911 | Great Britain. |
|---|---|---|
| 9,219 | 7/11 | Great Britain. |

OTHER REFERENCES

Catalysis, Berkman et al. (1940), page 974.

Moeller: Inorganic Chemistry, J. Wiley and Sons, N.Y. (1952), pages 577–579, 757–758, 837, 860 relied upon.

JOSEPH L. SCHOFER, *Primary Examiner.*

MORRIS LIEBMAN, *Examiner.*